US00RE36091E

United States Patent [19]

Wagner et al.

[11] E Patent Number: Re. 36,091

[45] Reissued Date of Patent: Feb. 9, 1999

[54] SHEET-FORM PAPER AND METHOD OF FABRICATING SAME

[75] Inventors: Richard C. Wagner, Frankfort, Ill.; James D. Azzar, 208 Pioneer Club Rd. SE., Grand Rapids, Mich. 49506

[73] Assignees: James D. Azzar, Grand Rapids, Mich.; Hollymatic Corporation, Countryside, Ill.

[21] Appl. No.: 799,097

[22] Filed: Feb. 11, 1997

Related U.S. Patent Documents

Reissue of:

[64] Patent No.: 5,458,952
Issued: Oct. 17, 1995
Appl. No.: 245,357
Filed: May 18, 1994

U.S. Applications:

[63] Continuation-in-part of Ser. No. 171,342, Dec. 21, 1993, abandoned, which is a continuation of Ser. No. 867,363, Apr. 13, 1992, abandoned, which is a continuation-in-part of Ser. No. 632,756, Dec. 24, 1990, Pat. No. 5,137,172.

[51] Int. Cl.[6] ..... B32B 9/00

[52] U.S. Cl. ..... 428/192; 428/486; 428/530; 428/537.5; 428/484; 221/197; 221/279; 221/312 R

[58] Field of Search ..... 428/484, 486, 428/192, 530, 537.5, 312 R; 221/198, 279, 197, 26, 36

[56] References Cited

U.S. PATENT DOCUMENTS

| | | | |
|---|---|---|---|
| 691,294 | 1/1902 | Schilz . | |
| 1,366,275 | 1/1921 | Payzant . | |
| 2,198,176 | 4/1940 | Perrin | 312/51 |
| 2,554,821 | 5/1951 | Garfunkel | 216/51 |
| 3,232,478 | 2/1966 | Thomasma et al. | 221/33 |
| 3,360,258 | 12/1967 | Nix | 271/18 |
| 3,461,483 | 8/1969 | Felstehausen | 17/32 |
| 3,589,711 | 6/1971 | Holly | 271/10 |
| 4,283,812 | 8/1981 | Corominas | 17/32 |
| 4,346,817 | 8/1982 | Karcher | 221/312 |
| 4,530,132 | 7/1985 | Wagner | 17/45 |
| 4,537,307 | 8/1985 | Tamura | 206/455 |
| 4,597,134 | 7/1986 | Wagner | 17/32 |

OTHER PUBLICATIONS

Judgement, entered Nov. 21, 1997, in Case No. 1:96–CV–156, *Hollymatic Corporation and James D. Azzar v Framarx Corporation and Lawrence Czaszwicz, Jr.*, United States District Court, Western Distrit of Michigan.

Order and Opinion, entered Jul. 8, 1997, in Case No:1:96–CV–156, *Hollymatic Corporation and James D. Azzar v* Rule 132 Affidavit of Richard C. Wagner, with exhibits, dated May 2, 1995, filed on May 19, 1995, in U.S. Patent Appl. Nov. 08/245,357 which matured into U.S. Patent No. 5,458,952.

Affidavit of Richard C. Wagner, with attachment, dated Aug. 15, 1996, in *Hollymatic Corporation and James D. Azzar v. Framarx Corporation and Lawrence Czawszicz, Jr.*, Civil Action No. 1:96–CV–156 (U.S. District Ct., W.D. Mich.).

Amended Order and Amended Opinion, dated Oct. 9, 1996, in *Hollymatic Corporation and James D. Azzar v. Framarx Corporation and Lawrence Czaszwicz, Jr.*, Civil Action 1:96–CV–156 (U.S. District Ct. W. D. Mich.).

Order dated Nov. 15, 1996 in *Hollymatic Corporation and James D. Azzar v. Framarx Corporation and Lawrence Czaszwicz*, Jr., Civil Action No. 1:96–CV–156 (U.S. District Ct., W.D. Mich.).

*Primary Examiner*—William Krynski
*Assistant Examiner*—Abraham Bahta
*Attorney, Agent, or Firm*—Van Dyke, Gardner, Linn & Burkhart, LLP

[57] ABSTRACT

A stack of paper is provided for separating portions produced by a portion control machine. The paper is dispensed from a paper feed system that feeds the bottom-most sheet from the stack along support rails that support opposite edges of the sheet. An integral stiffening strip extends between the opposite side edges of each sheet for stiffening the sheet therebetween and to minimize bowing of the sheet when supported at its opposite side edges. The stiffening strip has an arcuate cross-section, and the stiffening strip includes a rigidifying wax coating that is impregnated in the sheet at least to a greater extent in other areas of the sheet than at the strip. The invention also contemplates a method of fabricating the sheets of paper.

20 Claims, 1 Drawing Sheet

SHEET-FORM PAPER AND METHOD OF FABRICATING SAME

Matter enclosed in heavy brackets [ ] appears in the original patent but forms no part of this reissue specification; matter printed in italics indicates the additions made by reissue.

RELATED APPLICATIONS

This is *a reissue of Ser. No. 08/245,357 filed May 18, 1994 now U.S. Pat. No. 5,458,952 which is* a continuation-in-part of application Ser. No. 171,342, filed Dec. 21, 1993, now abandoned, which, in turn, is a continuation of Ser. No. 867,363, filed Apr. 13, 1992, now abandoned, which, in turn, is a continuation-in-part of Ser. No. 632,756, filed Dec. 24, 1990 which now is U.S. Pat. No. 5,137,172, dated Aug. 11, 1992 and which is incorporated herein by reference.

FIELD OF THE INVENTION

This invention generally relates to the art of sheet-form paper and, particularly, to sheet-form paper particularly adapted for separating portions produced by a portion control machine, along with a method of fabricating a sheet of paper for such applications.

BACKGROUND OF THE INVENTION

A variety of machines are used for producing portions in a portion control apparatus. In some portion control machines, sheet-form paper is used for separating the portions, the sheets often being dispensed from a paper feed system that feeds the bottom-most sheet of paper from a vertical stack of individual sheets.

One type of portion control machine forms patties of material, such as ground meat. Originally, the patties were formed by hand which involved unsanitary conditions resulting from human contact with the material, as well as a lack of uniformity in the weight, size and shape of the patties and limitations on the per worker output inherent with such labor intensive processes.

The portion control machines for forming patties overcame many of the shortcomings of hand-forming patties. These machines can produce patties in a sanitary manner that are substantially uniform in size, shape and weight and result in significant increases in per worker output.

Typically, a patty making machine has a mechanism that dispenses sheets of paper to be contacted with the patty to ensure separation of the patty from other patties or surfaces. The sheets prevent "sticking" of one patty or portion to another. The most prevalent type of sheet is of paper coated with wax. Some paper dispensing mechanisms use rolls of paper that are cut or torn to the desired length, but these rolls continuously must be replaced, which undesirably results in shut-down time for the patty making machine and, thereby, interrupting the patty making process.

Other paper dispensing mechanisms utilize precut sheets of paper that have one or more holes in the paper. The sheets are stacked with the aligned holes fitting over rods or pins from which the paper is torn during dispensing. Unfortunately, requiring rods to be threaded through the holes increases the difficulty in loading the paper. In addition, cutting or tearing the paper can undesirably result in small fragments of paper being deposited upon the patty. These and other disadvantages of precut sheets of paper having holes to facilitate stacking the sheets led to the use of a system wherein the sheets are provided with deformable elements, such as notches, in the side edges of the sheets.

More particularly, the referenced U.S. Pat. No. 5,137,172 shows a paper feed system suitable for use with a patty making machine to provide paper for separating the patties. A vertical stack of sheet-form paper is provided with a deformable element, such as a notch, on the side edge or edges thereof. A paper hopper is adapted to receive and temporarily retain the stack of paper sheets and is adapted to dispense the sheets by feeding the bottom-most sheet of paper from the stack. A male guide associated with the inside surface of the paper hopper engages the deformable element on the side edge of the sheets. A proximal end of the male guide adjacent to where the paper is dispensed temporarily retains the paper sheets in such a manner that the bottom-most sheet is dispensed without tearing the paper. In essence, the deformable elements, such as the notches, on the side edges of the sheets cause each individual sheet to be bent at an extreme angle when pulled past the male guide without tearing the paper.

Normally, the frictional force between the bottom-most sheet that is being dispensed and the next sheet in the stack is insufficient to pull the next sheet free from the guide, as it is not sufficient to overcome the "hold back" force resulting from the extreme bend required to free the paper from the guide. Accordingly, the next sheet is maintained within the paper hopper by its deformable element, and thus the paper should be dispensed only a single sheet at a time.

However, problems still have been encountered with certain sheet-form paper stock wherein there still is a tendency to pull two sheets of paper at a time if the paper feed system is not adjusted properly. Adding a more severe bend to the deformed or notched paper to increase its "hold back" force might be considered a solution to this problem, but it has been found that there is a tendency to tear the paper if it must be deformed too severely.

Another problem that continues to be present in paper feed systems for such sheet-form paper is that thinner sheets have a tendency to bow downwardly and fall out of the support means of the system. The feed mechanisms used to deposit the separating sheets between the patties or portions require that the sheet be supported under two of its opposite edges. More particularly, the sheets are fed along a support means which normally includes a pair of side rails which support the two opposite side edge areas of the sheets. While supported, a patty or portion is deposited on the top of a sheet which is then accelerated downward to the top of a stack below. Repeated positioning of additional sheets and subsequent depositing of the portions forms a stack of interleafed patties. Thinner sheets, such as on the order of 0.002 inches thick, have a tendency to fall down between the side support rails due to their own weight, even before a portion is deposited on the sheet. It would be advantageous to have a "stiffer" interleaf sheet so that it remains in position and does not fall out of the support rails during the stacking process.

The present invention is directed to a unique solution to the above-identified problems by providing a means for stiffening the sheets so that they do not fall through the support means, and particularly providing a sheet without adding significant cost. In addition, the stiffening means of the invention can be used to reinforce the deformable elements or notches at the side edges of the sheets to increase the "hold back" forces necessary to allow a bottom-most sheet to be pulled away from the next sheet in a stack thereof.

SUMMARY OF THE INVENTION

An object, therefore, of the invention is to provide a new and improved sheet-form paper for separating portions produced by a portion control machine.

Another object of the invention is to provide such sheet-form paper particularly adapted to be dispensed from a paper feed system that feeds the bottom-most sheet of paper from a vertical stack of individual sheets of paper.

A further object of the invention is to provide a method of fabricating a sheet of paper for use in systems of the character described.

In the exemplary embodiment of the invention, the bottom-most sheet of paper from the vertical stack thereof is adapted to be fed along a support means, such as a pair of spaced parallel support rails, that supports opposite edges of the sheets. According to the invention, a stiffening strip is provided integral with each sheet, extending between the opposite side edges of the sheet, for stiffening the sheet therebetween and to thereby minimize bowing of the sheet when supported by the support rails.

In the preferred embodiment of the invention disclosed herein, the stiffening strip is provided as a band having an arcuate cross-section. Each sheet has a wax coating that impregnates the paper of the sheet. The stiffening strip is pretreated with a material that inhibits or retards the absorption of the wax during the waxing process. Therefore, the wax coating at the strip is a more rigid composition.

According to another aspect of the invention, the stiffening strip is located such that the deformable elements (e.g. notches) at the side edges of the sheet are within the strip. Therefore, the stiffening strip performs a dual function of not only stiffening the sheet, itself, but adding rigidity to the deformable elements to increase the "hold back" force on the sheets as they are dispensed. However, the stiffening strip need not be located at the deformable elements, and there can be more than one stiffening strip per sheet.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
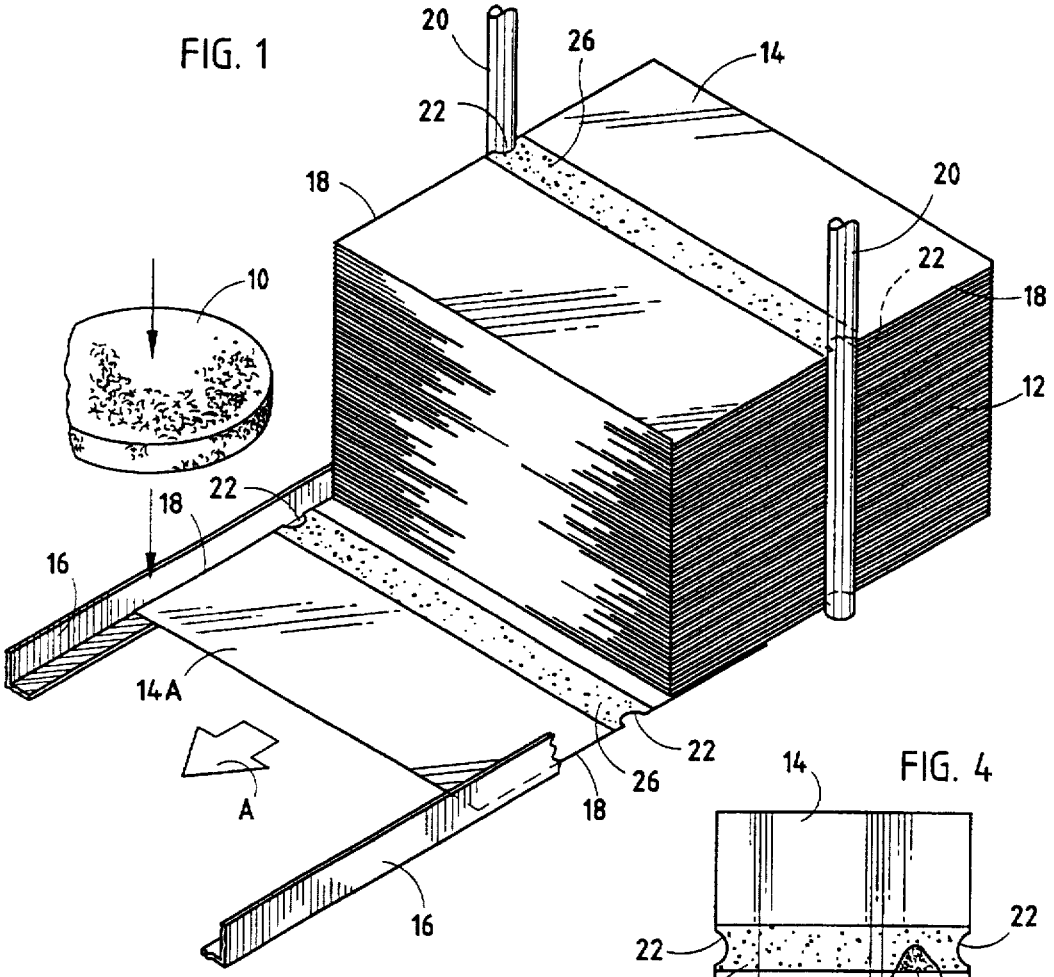
FIG. 1 is a somewhat schematic illustration of a paper feed system in which the invention is applicable.
Figure 2:
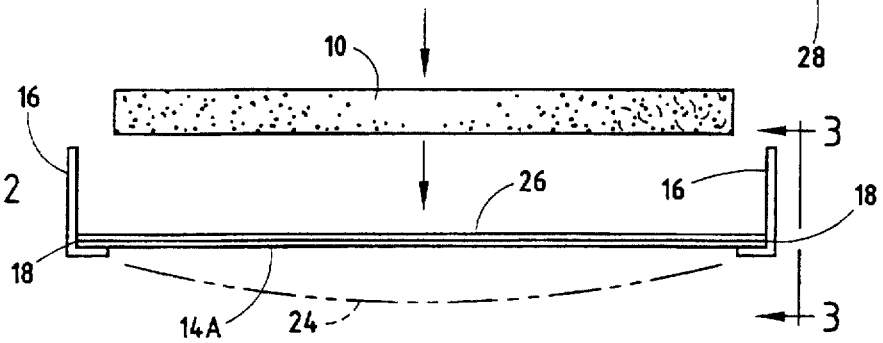
FIG. 2 is a front elevational view of the side support rails supporting an individual sheet of paper, with a patty thereabove.

Referring to the drawings in greater detail, and first to FIG. 1, the sheet-form paper of the invention is adapted for use in separating portions 10 produced by a portion control machine (not shown). For instance, the machine may be an apparatus for forming patties of material, such as ground meat, as shown in FIGS. 1 and 2. Of course, the concepts of the invention are useful in other applications.

The sheet-form paper of the invention includes a vertical stack 12 of individual sheets of paper 14. The stack of paper is to be dispensed from a paper feed system that feeds the bottom-most sheet 14A (FIG. 1) from the stack along a support means which includes a pair of side support rails 16 that support opposite side edges 18 of the sheet.

Generally, as shown in greater detail in U.S. Pat. No. 5,137,172 which is incorporated herein by reference, the paper feed system includes a pair of vertical male guides 20 which are received in deformable elements or notches 22 in side edges 18 of the sheets in stack 12. As the bottom-most sheet 14A is fed from stack 12 in the direction of arrow "A", the interengagement of guides 20 in notches 22 provide a "hold back" force to prevent the next sheet of paper above the bottom-most sheet from being pulled from the stack. In effect, the "hold back" force is defined by extreme bends required to free the paper from guides 20. Providing an increased "hold back" force is one aspect of the invention, as described hereinafter.

Another aspect of the invention is shown by phantom line 24 in FIG. 2. This phantom line represents the bowing affect heretofore encountered with thinner sheets of paper (e.g. approximately 0.002 inches thick) which, due to its own weight even before patty 10 is deposited on the sheet, tends to bow down and fall out of support rails 16 which engage only the side edge areas of the sheet, as shown. The invention is directed to solving both problems of providing an increased "hold back" on the sheets in the area of guides 20 (FIG. 1), as well as minimizing bowing of the sheets when supported by the support rails.

Figure 3:
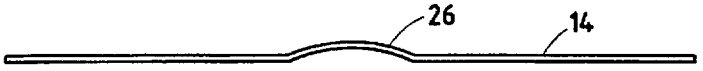
FIG. 3 is a side elevational view looking at one side edge of a sheet of paper, generally in the direction of line 3—3 in FIG. 2.

More particularly, according to the invention, each sheet 14 (14A) is provided with at least one integral stiffening strip 26 which extends between the opposite side edges 18 of the sheet. FIG. 3 shows that stiffening strip 26 is in the form of a band having an arcuate cross-section. In other words, the cross-sectional shape of the strip is convex when looking at the top face of the sheet in FIG. 3, and the cross-sectional shape of the strip is concave when looking at the bottom face of the sheet. There may be more than one strip per sheet.

Figure 4:
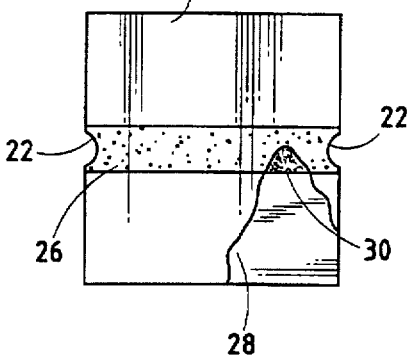
FIG. 4 is a top plan view, on a reduced scale, of a sheet of paper according to the invention, partially cut away through the wax coating thereof.

In addition, FIG. 4 shows that each sheet 14 has a wax coating 28 over the entire area of the sheet, including strip 26. It should be pointed out that, conventionally, one or both faces of paper sheets for separating meat patties or other moist portions is wax-coated to prevent the patties from sticking to the sheets. Generally, the wax is absorbed by the fibers of the paper forming the sheet. However, according to the invention, strip 26 is pretreated with a material, as at 30 (FIG. 4), which effectively inhibits or retards the absorption of the wax during the waxing process. Therefore, rather than being absorbed, the wax solidifies and forms a more rigid film-like composition for the stiffening rib.

In order to add strength to the paper using this concept and using a minimum amount of added wax, each paper sheet is pretreated with a strip of a wax inhibiting solution or material such as water or the like. The water may include an FDA approved dye if a visual effect is desired. The fibers of the paper stock absorb this material. During waxing of the sheet, liquid wax at approximately 190° F. is evenly distributed across the entire sheet including strip 26. Due to the wax inhibiting solution being within the fibers in the area of the strip, the wax is inhibited from being absorbed thereat. Since an even distribution of liquid wax has been distributed, the wax in the area of the strip solidifies around the paper fibers rather than being absorbed therewithin. This forms a more rigid composition in the area of the strip than the untreated area of the sheet. The added rigidity is due to the given wax material available solidifying at a position further away from the neutral axis of each fiber, thereby increasing the section modulus.

As stated above, although the strip can be located at various points on the sheet, and more than one strip can be used on each sheet, one of the strips 26 may perform a unique dual function in not only minimizing bowing of the sheet between support rails 16, but the strip can be used to increase the "hold back" force that must be overcome in order to pull a sheet away from guides 20. More particularly, it can be seen in the drawings, particularly FIGS. 1 and 4, that notches 22 are located within strip 26, i.e. at opposite ends of the strip. In other words, the notches are surrounded by the more rigid composition of the strip, described above, which, in turn, increases the "hold back" forces without in any way changing the geometry of the sheets of paper. Tests have proven that this rigidifying feature increases the "hold back" forces by as much as 9% over a comparable sheet that has not been preconditioned with the wax inhibiting solution before applying the wax to the sheet.

The arcuate cross-sectional shape of strip 26 can be accomplished without any forming processes on the sheet of paper. In particular, a slight warp occurs in the area of strip 26. FIG. 3 is somewhat exaggerated in the amount of warp in order to facilitate the illustration. The warp is due to the expansion of the fibers which absorb the water or similar wax inhibiting solution. The warp is set by the application of wax before the sheet shrinks back close to its original shape. This arcuate cross-sectional shape, however, increases the beam strength of the sheet significantly in the direction of the strip.

The invention conveniently takes advantage of various properties of paper and the manner in which it is manufactured. In particular, the cellulosic fibers which are used to make paper are hygroscopic (capable of absorbing water). As a result of the absorption of water, dimensional changes in paper result due to swelling of these fibers. This absorption results in changes of about 0.5% to 1% in the side-to-side width of the sheet (side-to-side being defined as a direction 90° to the direction in which the paper was manufactured on a continuously moving mesh belt). Dimensional changes in the direction of flow of the same sheet are significantly less because fibers tend to be aligned in that direction in the paper making process. (Changes in this direction are negligible to less than 0.5%.)

Taking advantage of the above properties of paper, the deposit of a thin line of water on a continuously moving web of paper causes the paper within that line to expand (i.e. strip 26). The web of paper, being restrained by the rollers it is transported on, "buckles up" or warps within the line of water deposit. If this sheet is dried without applying wax to the surface it will retain some of the warp due to hyperesis of the cellulosic fibers (each fiber does not shrink completely back to its original diameter). A more predominant warp is formed when the sheet is pretreated with a strip of water, preheated and waxed in a continuous process. Since the fibers of the paper stock still retain a percentage of the added moisture at the time the wax is applied, the wax coats the fibers in their expanded state and sets the "rib like" structure of strip 26 increasing its section modulus.

The increased section modulus allows a sheet of reduced weight to support itself as well as one without the strip. The obvious advantages are a sheet of reduced cost to perform the same function or one of the same cost to provide improved support of its own weight between the above noted rails required as a part of the paper dispensing mechanism.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. Sheet-form paper for separating portions produced by a portion control machine and dispensing from a paper feed system that feeds the bottom-most sheet of paper from a vertical stack of individual sheets of paper, the bottom-most sheet being supported by a paper feed system on opposite side edge areas of the sheet, each sheet of the sheet-form paper including at least one integral stiffening strip extending between said opposite side edge areas thereof to minimize bowing of the sheet when supported by a paper feed system.

2. The sheet-form paper as defined in claim 1, wherein said stiffening strip comprises a band having an arcuate cross-section.

3. The sheet-form paper as defined in claim 1, wherein said stiffening strip comprises a rigidifying wax coating that is impregnated in the sheet at least to a greater extent in other areas of the sheet than at the strip.

4. The sheet-form paper as defined in claim 3, wherein said stiffening strip comprises a band having an arcuate cross-section.

5. The sheet-form paper as defined in claim 1, wherein each sheet has a deformable element on at least one side edge within the stiffening strip, the deformable element being adapted to engage a vertical guide at one side of the vertical stack of individual sheets of paper.

6. The sheet-form paper as defined in claim 5, wherein said stiffening strip comprises a rigidifying wax coating that is impregnated in the sheet at least to a greater extent in other areas of the sheet than at the strip.

7. The sheet-form paper as defined in claim 6, wherein said stiffening strip comprises a band having an arcuate cross-section.

8. The sheet-form paper as defined in claim 5, wherein said deformable element comprises a notch for receiving a male guide.

9. A stack of paper for separating portions produced by a portion control machine and to be dispensed from a paper feed system that feeds the bottom-most sheet from the stack along a means for supporting opposite edges of the sheet, said stack of paper comprising:

a plurality of individual sheets of paper each having opposite side edges, and at least one integral stiffening strip extending between the opposite side edges for stiffening the sheet therebetween and to thereby minimize bowing of the sheet when supported by a support means.

10. The stack of paper as defined in claim 9, wherein said stiffening strip comprises a band having an arcuate cross-section.

11. The stack of paper as defined in claim 9, wherein said stiffening strip comprises a rigidifying wax coating that is impregnated in the sheet at least to a greater extent in other areas of the sheet than at the strip.

12. The stack of paper as defined in claim 11, wherein said stiffening strip comprises a band having an arcuate cross-section.

13. The stack of paper as defined in claim 9, wherein each sheet has a deformable element on at least one side edge within the stiffening strip, the deformable element being adapted to engage a vertical guide at one side of the vertical stack of individual sheets of paper.

14. The stack of paper as defined in claim 13, wherein said stiffening strip comprises a rigidifying wax coating that is impregnated in the sheet at least to a greater extent in other areas of the sheet than at the strip.

15. The stack of paper as defined in claim 14, wherein said stiffening strip comprises a band having an arcuate cross-section.

16. The stack of paper as defined in claim 13, wherein said deformable element comprises a notch for receiving a male guide.

17. A stack of paper for separating portions produced by a portion control machine and to be dispensed from a paper feed system that includes a paper hopper having a front, a first sidewall and an opposed second sidewall and longitudinal vertically oriented male guides having a semicircular horizontal cross-section extending from the inside surface of each of said sidewalls, said guides having proximal ends adjacent to where the paper is dispensed which are sloped toward the front of the hopper and tapered to a greater front to back width than the remainder of said guides, said stack of paper comprising:

a plurality of individual sheets of paper each having semicircular recesses on opposite sides thereof, said sheets being in face-to-face relationship with a friction force between said faces, said recesses being centrally located on each side of each paper sheet and substantially aligned with the recesses of the other sheets of the stack of paper, receiving paper hopper guides when the sheets of paper are stacked in a hopper, and having a radius only slightly greater than the cross-section of paper hopper guides when stacked in a paper hopper;

whereby the sheets at the bottom of the stack are when stacked in a paper hopper supported on their sides by proximal ends of paper hopper guides in a feathered relationship and the bottom-most individual sheet of paper is bent at an extreme angle when pulled past paper hopper guides without tearing said paper when dispensed from a hopper, the resistance of said individual sheets of paper to said bending at an extreme angle being greater than said friction force between said sheet faces.

*18. A stack of paper for separating portions produced by a portion control machine and to be dispensed from a paper feed system that includes a paper hopper having a front, a first sidewall and an opposed second sidewall and longitudinal vertically oriented male guides having a semicircular horizontal cross-section extending from the inside surface of each of said sidewalls, said guides having proximal ends adjacent to where the paper is dispensed which are sloped toward the front of the hopper and tapered to a greater front to back width than the remainder of said guides, said stack of paper comprising:*

*a plurality of individual sheets of paper each having recesses on opposite sides thereof,*

*said sheets being in face-to-face relationship with a friction force between said faces,*

*said recesses being centrally located on each side of each paper sheet and substantially aligned with the recesses of the other sheets of the stack of paper,*

*receiving paper hopper guides when the sheets of paper are stacked in a hopper, and*

*having a dimension only slightly greater than the cross-section of paper hopper guides when stacked in a paper hopper;*

*whereby the sheets at the bottom of the stack are when stacked in a paper hopper supported on their sides by proximal ends of paper hopper guides in a feathered relationship and the bottom-most individual sheet of paper is bent at an extreme angle when pulled past paper hopper guides without tearing said paper when dispensed from a hopper, the resistance of said individual sheets of paper to said bending at an extreme angle being greater than said friction force between said sheet faces.*

*19. The stack of paper as defined in claim 18, wherein said recesses are non-rectangular.*

*20. The stack of paper as defined in claim 19, wherein said recesses are arcuate.*

* * * * *